G. F. HELSON.
APPARATUS FOR FILLING BOTTLES.
APPLICATION FILED SEPT. 5, 1916.

1,253,820.

Patented Jan. 15, 1918.
4 SHEETS—SHEET 3.

WITNESS
Chas. F. Clagett

INVENTOR
Gilbert F. Helson
BY Serrell & Son
HIS ATTORNEYS

G. F. HELSON.
APPARATUS FOR FILLING BOTTLES.
APPLICATION FILED SEPT. 5, 1916.

1,253,820.

Patented Jan. 15, 1918.
4 SHEETS—SHEET 4.

WITNESS
Chas. F. Clagett

INVENTOR
Gilbert F. Helson
BY
Serrell & Son
HIS ATTORNEYS

UNITED STATES PATENT OFFICE.

GILBERT F. HELSON, OF NEW YORK, N. Y.

APPARATUS FOR FILLING BOTTLES.

1,253,820.  Specification of Letters Patent.  Patented Jan. 15, 1918.

Application filed September 5, 1916. Serial No. 118,396.

*To all whom it may concern:*

Be it known that I, GILBERT F. HELSON, a subject of the King of Great Britain, but having declared my intentions of becoming a citizen of the United States, residing at the borough of Richmond, in the county of Richmond, city and State of New York, have invented an Improvement in Apparatus for Filling Bottles, of which the following is a specification.

My present invention relates to apparatus particularly adapted to the filling of bottles with liquids, although it is also applicable to the filling of bottles or like receptacles with condiments, such as ground spices and like substances.

The apparatus consists essentially of the combination and novel arrangement of supply reservoirs, overflow receptacles, and tubing or pipes provided with valves; exhausting the air from the supply pipes by means of a suitable pump, the bottles being filled forming a part of the vacuum conduit; drawing the filling material by suction from the supply reservoirs into the bottles; and by the same action conveying any surplus or overflow of material to the overflow receptacles, from which it is returned to the supply reservoirs.

The apparatus is double-acting; that is to say, there are two supply reservoirs for the filling material, one on each side of the apparatus, and between which the operator is positioned, there are also two overflow receptacles each connected in the same manner with the vacuum, delivery and overflow tubing, in which the valves are all simultaneously operated by a single controller bar shifted by a hand lever, so that when the filling material rises above the maximum level in the overflow receptacle being operated, such receptacle can be shut off by simply shifting the valve controlling rod by means of said lever, when the other overflow receptacle on the opposite side of the apparatus is brought into action simultaneously, so that there is no interruption in the working of the apparatus and in the meantime the filling material accumulated in the first overflow receptacle is being returned to the supply reservoir on that side of the apparatus.

One object of the invention is to generally facilitate the filling of a plurality of bottles simultaneously and rapidly; another object of the invention is to prevent any waste of the filling material by conveying any surplus or overflow after a series of bottles have been filled, to an overflow receptacle and returning it therefrom back to the supply reservoir; a further object is to provide for filling bottles of various size and height; another object is to dispense with an overhead supply tank and arrange the supply reservoirs in convenient position to the operator where their contents may be continuously observed and replenished when necessary by an attendant with ease and without any interruption in the working of the apparatus; still another object of the invention is for carrying the filled bottles out of the way to give place for other empty bottles to be filled without the necessity of the operator handling the filled bottles.

The details of the invention are hereinafter particularly described.

In the accompanying drawings:—

Similar reference characters denote the same parts throughout the several figures of the drawing.

10, indicates the upright supporting frame for the apparatus which rests upon a base or flooring 11, to which it may be secured in any suitable manner.

12, and 13, indicate two reservoirs for containing the filling material. These reservoirs rest upon the base or floor 11, and are positioned in front of and adjacent the frame 10, one on each side thereof.

14, designates a rock-shaft, the ends of which are journaled in bearings 15, secured to the front of the frame 10.

16, indicates two brackets secured to the front of the frame 10, one on each side thereof and projecting forwardly therefrom a predetermined distance, terminating with enlarged ends or heads 17 through the center of each of which there is a smooth vertical bore.

18, designates a platform positioned in front of the frame 10; 19, indicates two pins each having one flanged end which is secured to the underside of the platform 18, by bolts or screws or in any other suitable manner. These pintles extend downwardly and pass into and through the bores in the ends of the brackets 16.

20, indicates two bifurcated studs secured to the underside of the platform 18, one adjacent each end thereof. 21, designates two link-bars one end of each of which is pivotally secured to said studs by pivot pins 22.

23, designates two crank-arms one end of each of which is rigidly connected to the rock-shaft 14. The free ends of these crank arms are bifurcated and receive the lower ends of the link bars 21, to which they are pivotally secured by the pivot-pins 24.

25, indicates another crank-arm secured to the rock-shaft 14, at or about the longitudinal center thereof and extending therefrom in a rearward direction or in an opposite direction to that of the crank arms 23.

26, designates a foot-treadle one end of which is pivotally connected or hinged to the frame 10, as at 27.

28, indicates the treadle rod the lower end of which is pivotally connected to the foot-treadle 26, as at 29, while its upper end is pivotally connected to the free end of the crank arm 25, as at 30.

One end of the rock-shaft 14, extends a short distance beyond its bearing and to this end of the shaft there is fastened a crank 31. The free end of this crank is bifurcated and one end of a pitman rod 32, is pivotally secured thereto by a pivot-pin 33.

Secured to the platform 18, one at each end thereof, is a vertical end member 34, upon the opposite surfaces of which are correspondingly spaced transverse grooves 35.

36, designates a shelf having a flange 37, along each end adapted to fit into the grooves 35, in the end members 34; 38, indicates two uprights secured at their bottom to the shelf 36, one at each end thereof.

39, designates a push-bar the respective ends of which are journaled in bearings in the upper ends of the uprights 38. One end of this push-bar extends beyond its bearings where it is bent at right angles and pivotally connected with one end of the pitman rod 32. This rod is provided with spaced holes, and the end of the push-bar is reduced and threaded. This reduced threaded end is passed through one of the holes in the pitman rod and a nut 40, is screwed upon such projecting threaded end of the bar.

Figure 1:
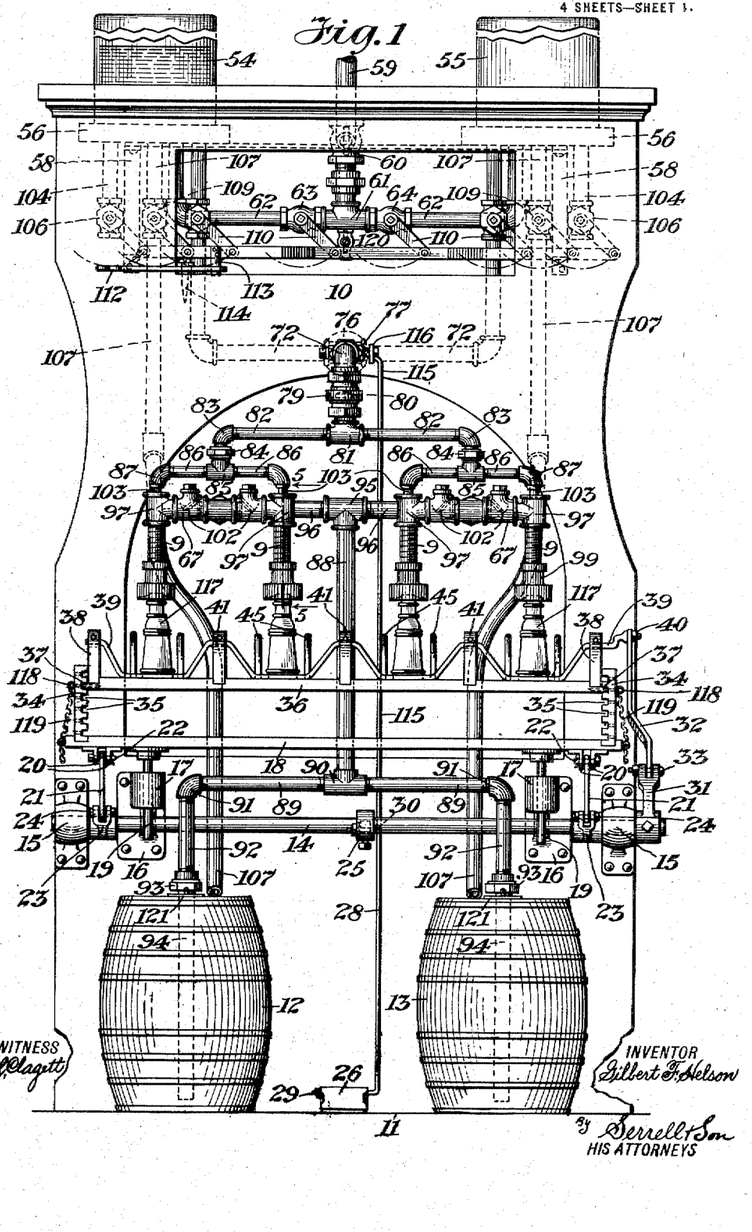
Figure 1, is a front elevation of my improved apparatus.

41, indicates three uprights secured to the top of the shelf 36, and arranged transversely thereof at equally spaced distances. In the top of each of these uprights 41, there is a notch or groove 42, into which the pusher bar 39, rests. Those portions of the pusher-bar between said uprights 38, and 41, are bent convergingly leaving a straight portion between the converging portions as shown most clearly in Fig. 1.

Figure 4:
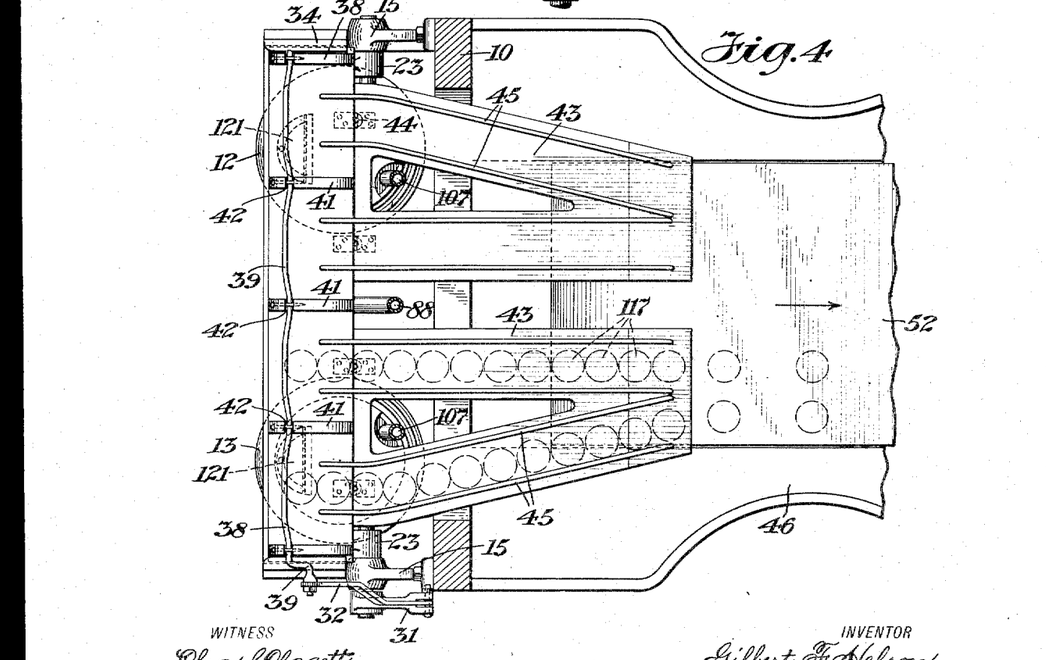
Fig. 4, is a plan view taken on the broken line 4—4 of Fig. 2.

43, indicates an inclined chute attached at one end to the shelf 36, by a hinged connection 44. The top surface of the chute 43, is provided with guide ways 45, as shown most clearly in Fig. 4.

46, designates a table secured at one end to the rear of the frame 10; 47, indicates a roller or cylinder upon a shaft 48, journaled in bearings 49, supported by a bracket 50, secured to the underside of the table 46. 51, is a screw for adjusting the roller 47, to take up any possible slack that might occur in the conveyer band 52, which passes around the roller 47, and over the table 46, the upper surface of which is preferably provided with a longitudinal channel to receive said conveyer band.

53, indicates a hinged extension of the chute 43, the free end of which rests upon the conveyer band 52.

The arrows indicate the direction of travel of the conveyer band.

This band is driven from any suitable source, such as a roller at the other end, the shaft of which is provided with a drive pulley, (not shown).

54, and 55, indicate two inverted overflow receptacles, preferably of glass, and open at the bottom.

These inverted tanks each rest within a depression in the upper surface of a base 56, and upon the gaskets 57. These receptacles I have illustrated as cylindrical, but they may be square or other shape if desired, the depressions in the bases of course being made of a corresponding shape, as well as the gaskets, so that the connection may be air-tight.

58, designates two brackets secured to the upper part of the frame 10, at its rear, one on each side thereof, upon which the bases 56, of the receptacles 54 and 55, rest and are supported.

59, is an air-outlet pipe communicating at its upper end with a vacuum tank having an air outlet connected with an air exhaust, the latter not being shown, as the tank and pump may be of any well known character.

The pipe 59, extends vertically for a predetermined distance and is provided with a cock 60, which is always open while the apparatus is being operated, but which may be closed by hand when desired, or when the operation of the apparatus is stopped.

Below this cock 60, the pipe 59, is united by a coupling 61, to a horizontal branch pipe 62, which extends on both sides of the pipe 59.

At each side of the coupling 61, the branch pipe 62, is provided with a valve, respectively indicated by 63, and 64.

The branch pipe 62, is connected at each end to a vertical branch pipe 65, by the elbows 66.

These two vertical branch pipes 65, extend into the receptacles 54, and 55, one into each on the respective sides of the apparatus, through a bushing, secured within an opening in the base 56, of each receptacle which are rendered air-tight by suitable gaskets.

These branch pipes 65, rise within the respective receptacles 54, and 55, to a height above the maximum level of the filling material.

These branch pipes 62, and 65, are a continuation of the pipe 59, and are all air-outlet pipes.

69, designates two pipes, the upper ends of which are one in the receptacle 54, and the other in the receptacle 55. That portion of each of these pipes within the receptacle is bent over so that its orifice is positioned a predetermined distance from the bottom of the receptacle.

These pipes 69, extend through the bottoms of the respective receptacles 54, and 55, within bushings 70, similar to the bushings for the branch pipes 65, and similar gasket 68. In each of the pipes 69, at a predetermined distance below the respective receptacles, there is a valve 71, and at a predetermined distance below such valves, these pipes 69, are united to the horizontally disposed branch pipe 72, by suitable elbows 73.

Connected to the pipe 72, by a suitable union joint 74, at an equal distance between the two pipes 69, is a branch pipe 75, projecting forwardly in a straight line in front of the frame 10.

This branch 75, passes through a hole in the frame and through a hollow stud 76, which is secured to the rear of the frame.

In that part of the branch pipe 75, forward of the frame 10, there is a three way cock 77.

Coupled to the end of the branch pipe 75, is a downwardly turned elbow 78, the lower end of which is connected to a union joint 79, within which is a vertically acting check valve 80, and the lower end of the joint 79, is connected with a coupling 81, to each side of which is connected a horizontal branch pipe 82, at each end of which is connected an elbow 83, to the other ends of which short pieces of pipe extending downwardly are connected, which by coupling nuts 84, and coupling 85, are connected with short sections of pipes 86, horizontally disposed, at the respective ends of which are joined elbows 87, downwardly turned.

88, indicates a vertical pipe arranged centrally of the apparatus, its lower end being connected to horizontal branches 89, by the coupling 90. These branches extend on either side of the pipe 88. At the end of each of these branches there is connected an elbow 91, downwardly turned and to the other end of each of these couplings there is connected a vertical branch 92. The lower ends of these branches are screw-threaded upon each of which is screwed a coupling nut 93, which nuts each also screw upon another section of pipe 94, one of which extends into each of the supply reservoirs to a predetermined distance from the bottom thereof. The coupling nuts 93, allow for readily changing the lower sections of pipe where longer or shorter sections are required according to the depth of the reservoirs employed.

A coupling 95, connects the upper end of the pipe 88, with two horizontal pipe sections 96, one at each side, which extend behind and parallel with union joints 97, and intermediate coupling members 67. An elbow 122, is connected at each end of the pipe sections 96, and coupling nuts 123, and short sections of pipe 124, connect said pipes 96, with the coupling members 67, between the union joints 97, which are all in alinement with each other, and equally disposed on either side of the pipe 88. Connected to the bottom of each union 97, and in communication with the interior thereof are delivery tubes 98. Each of these tubes extend downwardly within a tube 9 of considerably larger diameter exteriorly screw-threaded, the upper ends of which are screwed into a threaded opening in the bottom of each union joint 97.

The lower end of each delivery tube 98, extends below the lower ends of the tubes 9 to a predetermined extent. An interiorly threaded sleeve 99 is screwed upon each of the tubes 9. The lower ends of these sleeves are of enlarged diameter and threaded exteriorly on such portions. Upon the enlarged portion of each of said sleeves there is screwed a collar 100, having a central opening in its bottom from which its lower surface is inclined outwardly to its outer edge. There is preferably a gasket 101, secured within the circular opening in each collar. The features last described are most clearly illustrated in Fig. 5 of the drawing.

In the couplings 67, between the union joints 97, on each side of the pipe 88, there are clack-valves 102.

Figure 5:
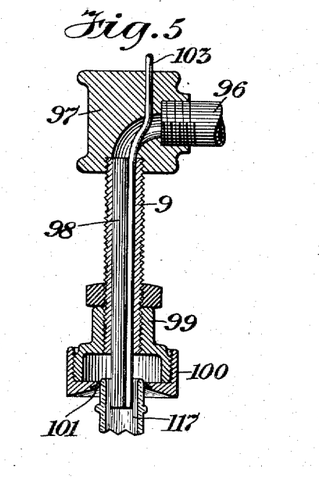
Fig. 5, is a detail sectional view taken on the line 5—5 of Fig. 1.
Figure 6:
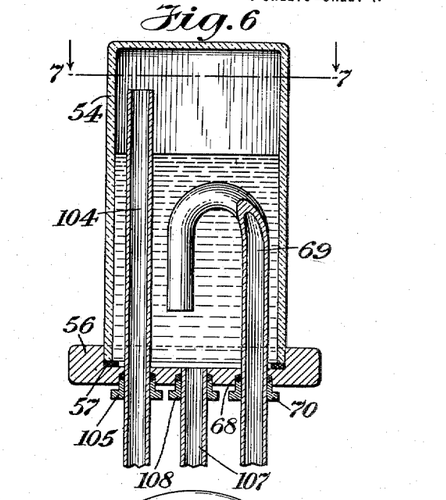
Fig. 6, is a vertical section of one of the overflow receptacles taken on the transverse center.
Figure 7:
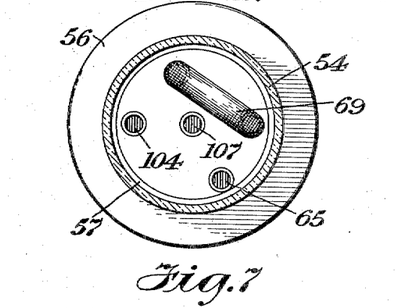
Fig. 7, is a sectional view taken on the broken line 7—7 of Fig. 6.
Figure 8:
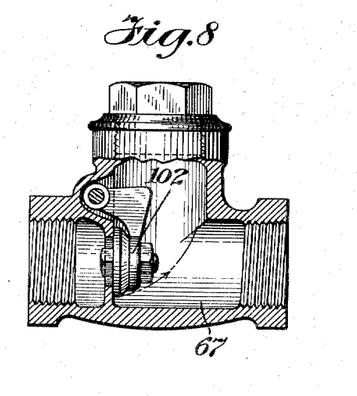
Fig. 8, is a detail sectional view of one of the clack valves.

Connected with each of the elbow joints 87, there is a tube 103, of reduced diameter, each of which extends downwardly through the respective union joints 97, and tubes 9 along outside the delivery tubes 98, and within the sleeves 99 and collars 100, and terminate on a level with the lower ends of said delivery tubes 98. This is best illustrated in Fig. 5 of the drawing.

104, indicate two vent pipes, the upper open end of one of each being within the respective receptacles 54, and 55, at a height above the maximum level of the filling material. These vent pipes project through bushings 105, in the bases 56, and at their lower ends are each provided with a valve 106.

107, designates two drain pipes, one for each of the receptacles 54 and 55.

The upper open end of each of these pipes communicates with the interior of the respective receptacles and is secured in a bushing 108, fixed in an opening, in the center of each base 56, the connection being rendered airtight.

These drain pipes lead to the top of the respective supply reservoirs 12 and 13, in which there is an opening in register with the lower orifice of the respective drain pipes.

At a point in a horizontal line with the valves in the pipes 62, 69, and 104, the drain pipes 107, are each provided with a valve 109. A crank arm 110 is connected at one end with each of the valves in the pipes 62, 69, 104 and 107, and the free end of each of said crank arms is pivotally connected to a controller bar 111, horizontally disposed which can be shifted to the right or left by a hand lever 112, to which it is connected by a link 113. This hand lever is pivotally connected to the frame 10, as at 114, in convenient reach of the operator.

When the valve controlling bar 111, is shifted to the left by means of the lever 112, the valve 63, in the horizontal branch pipe 62, on the left side of the air outlet pipe 59, is opened while the valve 64, in the same pipe on the right side of the air outlet pipe 59, is closed, this shuts off communication between the receptacle 55, on the right side of the apparatus and the air outlet pipe 59, while communication between the receptacle 54, on the left side of the apparatus and the air-outlet pipe 59, is established.

The same movement of the bar 111, opens the valve 71, in the pipe 69, connected with the receptacle 54, closes the valve 109, in the drain pipe 107, connected with the same receptacle, and closes the valve 106, in the vent tube 104, in said receptacle 54, while the reverse action takes place with the valves in the corresponding pipes connected with the receptacle 55, on the right hand side of the apparatus.

When the bar 111 is shifted to the right, the valve 63, in the pipe 62, is closed, and the valve 64, in said pipe is opened, thus shutting off communication between the air-outlet pipe 59, and the receptacle 54. This movement of the bar 111, simultaneously closes the valve 71, in the pipe 69, connected with the receptacle 54, opens the valve 109, in the drain pipe 107, connected with the receptacle 54, and also opens the valve 106, in the vent tube 104, in the same receptacle, while the reverse action takes place with the valves in the corresponding pipes connected with the receptacle 55.

115, indicates a connection rod, the upper end of which is pivotally connected with the controlling lever 116, of the three-way cock 77, while its lower end is pivotally connected to the crank arm 25, upon the rock-shaft 14. Upon depressing the foot-treadle 26, the end of the lever 116, is drawn down by the connection rod 115, which action opens the cock 77, and with the check valve 80, raised from its seat by suction, it will be seen that there is then an open passageway from either of the receptacles 54 or 55, in which the valve 71, in the pipe 69, may be open extending to the orifices in each of the lower ends of the tubes 103, in alinement with the lower ends of the delivery tubes 98.

It has been heretofore explained that the pipe connections with both the receptacles 54, and 55, are exactly the same, and that the valves within the pipes leading to and from the respective receptacles are opened or closed in the reverse order according to which receptacle is being operated in the filling of the bottles. During the filling operation only one of said receptacles is coacting with the other parts of the apparatus at one time; these receptacles are brought into action alternately for the reason hereafter explained.

When all the clack valves 102, in the couplings 67 are drawn from their seats, there is an open passageway leading from the mouths of all the delivery tubes 98, to the lower open ends of the pipe sections 94, in each of the supply reservoirs 12, and 13.

The bottles 117, to be filled, are placed upon the top of the shelf 36, in spaced alinement and in a position to register with the open lower ends of the respective delivery tubes 98, and intake tubes 103, when the platform 18, is raised, the shelf having first been placed in the proper grooves 35, in the end members 34, of said platform to agree with the height of the bottles to be filled, and I preferably form slight spaced depressions in the top surface of the shelf to receive the bottoms of the bottles and to aid in the proper positioning of the bottles with respect to the delivery and intake tubes. These depressions are not however, of sufficient depth to prevent the bottles being readily pushed forward upon the chute 43, after being filled. To prevent any possible lateral movement of the shelf 36, after it has been positioned in the proper grooves in the end members of the platform 18, I prefer to employ pins 118, which pass through holes in the end members into holes in the ends of the shelf registering with each other.

To prevent loss or misplacement of such pins I attach them to one end of a chain or cord 119, the other end of which may be connected to the end of the platform.

120, indicates a cock for clearing the air out-let pipe 59, from any water of condensation or other possible sediment.

121, designates a cover for an opening in the top of each supply reservoir 12, and 13, through which the filling material is introduced and can be observed from time to time by the operator.

I have illustrated the two supply receptacles in the shape of barrels or hogsheads, but of course they may be of any desired shape or dimension.

The working of the apparatus is as follows:

The entire apparatus being free of filling material, both supply reservoirs 12, and 13, are first filled with the material to be conveyed to the bottles; which material will rise to its own level in the pipes 94, in the reservoirs;—the bottles to be filled are then placed in their proper relative positions upon the shelf 36; the valve controlling bar 111, is shifted either to the right or left by means of the hand-lever 112, according to which one of the overflow receptacles 54, or 55, is desired to be first brought into action.

The cock 60, in the air-outlet pipe 59, is then opened, and the operator depresses the foot treadle 26, which pulls down the free end of the crank-arm 25, thereby partially rotating the rock shaft 14, which by means of the link-bars 21, raises the platform 18, carrying with it the shelf 36, and bottles 117, thereon.

The pins 19, working in the smooth bores in the bracket heads 17, causing the rise or fall of the platform to be steady and uniform.

The extreme upward movement of the platform 18, brings the mouths of the bottles to be filled in register with the lower open ends of the respective delivery tubes 98, which together with the lower open ends of the tubes 103, pass into the necks of the bottles to a predetermined extent which can be regulated by the sleeves 99, and collars 100.

The inclined under surfaces of the collars act to direct the bottles correctly to position should any one or more of them be out of perfect alinement with the tubes when the platform is raised, and the gaskets 101, render the connection between the bottles and tubes 98, and 103, air-tight.

When the foot-treadle 26, is depressed it also opens the cock 77, by means of the connection rod 115.

The bottles have now closed one end of the passage ways between the respective delivery tubes 98, and the reservoirs 12, and 13, while the filling material has closed the other. The bottles in this position also form a connection between the passageway to the supply reservoirs, and the passage way between the open ends of the tubes 103, and either the receptacle 54, or the receptacle 55, according to the direction in which the valve controlling bar 111, has been shifted.

Figure 2:
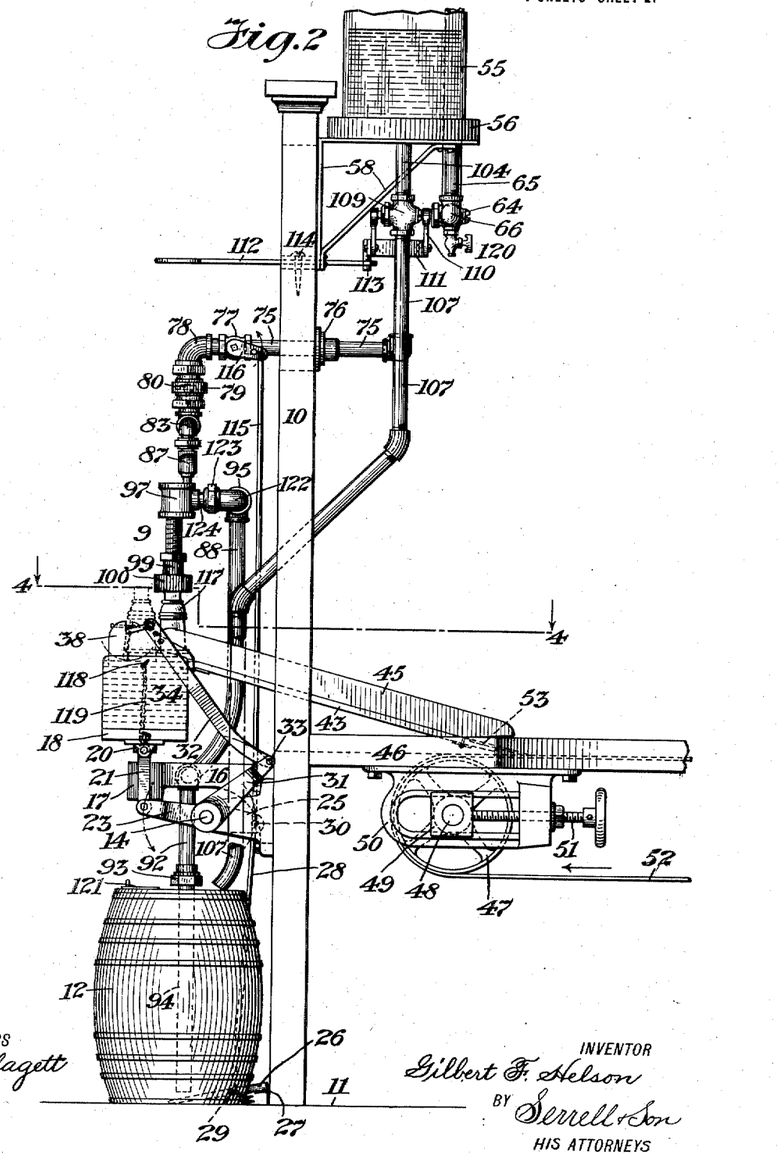
Fig. 2, is a side elevation of the same.
Figure 3:
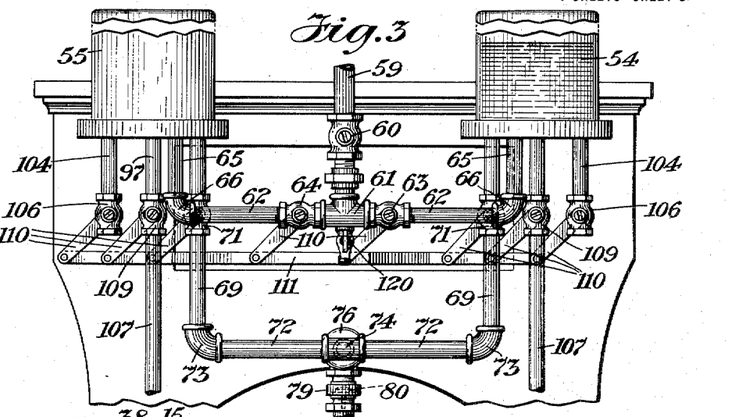
Fig. 3, is a rear elevation of the upper part of the apparatus.

This connection is maintained so long as the foot-treadle 26, is held depressed. The apparatus is illustrated in this position in Figs. 1 and 2 of the drawing.

In the meantime either the receptacle 54, or 55, which forms a part of this connection has been exhausted of air through the pipe 65, which in turn exhausts the pipe 69, and its branches raising the check valve 80, from its seat and continuing the exhaust through the tubes 103, and bottles in connection therewith, thence through the delivery tubes 98, and union joints 97, and couplings 67 drawing the clack valves 102, therein from their seats and continuing through the pipe 88, and its branches to the sections of connected pipes 94, within the supply reservoirs 12 and 13.

The suction continuing the filling material is drawn from the reservoirs through the connecting branches into the pipe 88, and from that pipe into the piping 96, and union joints 97, from which it passes into the delivery tubes 98, and from such tubes into the bottles. As soon as the filling material rises in the bottles to the desired height, the operator releases the pressure on the foot treadle 26, when the weight of the platform together with that of the shelf and bottles causes the platform to drop back to normal position, at the same time returning the foot-treadle to a raised position and closing the cock 77, shutting off the vacuum action below, whereupon the check valve 80, drops to its seat preventing the return of any filling material from above it; at the same moment the clack-valves 102, fall back upon their seats closing the passage in the couplings 67 and union joints 97, shutting off the flow of filling material into the delivery tubes 98, and any surplus filling material remaining in the tubes 98, when the filled bottles are released or drawn away from such tubes, is taken up by the tubes 103, and held in suspension, which is only momentary, the device being worked with great rapidity.

When the rock-shaft 14, is given a partial rotation by the depression of the foot-treadle 26, the pitman rod 32, is operated throwing the bent portions of the push-bar 39, between the upright bearings 38, and 41, outwardly which leaves spaces between said bent portions of the push-bar and the bottles being filled. Into such spaces the operator places empty bottles which contact on one side with the bottles being filled, and on the opposite side with the bent portions of the push-bar.

When pressure on the foot-treadle is released and the platform drops, through the action of the pitman rod the bent portions of the push-bar return to a normal or vertical position and in so doing carry forward the row of empty bottles which in turn push forward the filled bottles, the empty bottles taking the place of the filled bottles in a position to register with the open ends of the delivery nozzles 98, and tubes 103, when the platform is again raised. This operation is rapidly repeated and in the meantime the filled bottles are pushed into the guide-ways 45, upon the incline chute 43, and continue to move forward upon the hinged extension 53, from which they pass to the conveyer band 52, upon which they are drawn along to corking, labeling and wrapping devices (not shown).

During the operation of the apparatus, the surplus filling material which is drawn from the delivery tubes 98, into the intake tubes 103, gradually fills that pipe 69, which leads to the receptacle 54, or 55, being employed, through the tubular connections between such pipe 69, and the intake tubes 103. When such pipe 68, is full of the filling material, such material discharges into the overflow receptacle through the curved upper end of such pipe. The receptacles 54, and 55, being of glass the operator can readily watch the rise of the overflow material therein and when it reaches a predetermined height, which is at a point below the orifices of the pipes 65, and vent tubes 104 in said receptacles, the operator shifts the valve controlling bar 111, in the opposite direction thereby closing the valve in the pipe 65, connected with that receptacle, opening the valve in the vent tube 104, and also opening the valve 109, in the drain pipe 107, connected with the same receptacle; the same movement of the bar 111, simultaneously causes a reverse action in the valves of the corresponding pipes connected with the other receptacle, and the filling operation is thus continued without interruption. The valve 109, in the drain pipe 107, connected with the receptacle 54, or 55, first employed, being now open, the overflow of filling material accumulated in such receptacle will return to the supply reservoir on the same side of the apparatus which will leave said receptacle free from any filling material before it is necessary to again bring that receptacle into action.

I have illustrated my improved apparatus as filling four bottles at the same time, but it will be readily understood that it may be constructed to fill a greater or less number of bottles at the same time if desired.

To relieve the suction on the upper ends of the bottles after they have been filled, the cock 77, is a three way cock, that is, there is a very small air passage through its bottom, which when the main passage ways to the pipe 75, and elbow 78, are closed, communicates between the elbow 78 and the atmosphere, but which communication is closed when the main passage ways are open. For the same purpose, the check valve 80 may be provided with a small vent, although while seating sufficiently tight to prevent the return of any filling material this check valve does not seat absolutely airtight.

It will readily be seen that the apparatus might be operated with one overflow receptacle and either one or two supply reservoirs, but in such case when the overflow of material reached the maximum level in the overflow receptacle the apparatus would have to be stopped until the overflow receptacle was drained, while with the employment of the two overflow receptacles there is no interruption in the working of the apparatus as the one receptacle is drained while the filling material is accumulating in the other.

I claim as my invention:

1. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, an adjustable support for the bottles, means for raising said support and thereby bringing the end of one of said delivery tubes and one of said branches into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle.

2. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, an adjustable support for the bottles, means for raising said support and thereby bringing the end of one of said delivery tubes and one of said branches into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle, and a drain pipe communicating directly between the overflow receptacle and the supply reservoir.

municating directly between the overflow receptacle and the supply reservoir.

3. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, an adjustable support for the bottles, means for raising said support and thereby bringing the end of one of said delivery tubes and one of said branches into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle, a drain pipe communicating directly between the overflow receptacle and the supply reservoir, and a vent tube within the overflow receptacle and extending therefrom.

4. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, an adjustable support for the bottles, means for raising said support and thereby bringing the end of one of said delivery tubes and one of said branches into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacles, a drain pipe communicating directly between the overflow receptacle and the supply reservoir, a valve within said pipe, a vent tube within the overflow receptacle and extending therefrom, a valve within said tube, and means for simultaneously shutting off the air exhaust from the overflow receptacle, breaking the vacuum in the branches leading therefrom and opening the valves in the drain pipe and vent tube.

5. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, an adjustable support for the bottles, means for raising said support and thereby bringing the end of one of said delivery tubes and one of said branches into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle, a drain pipe communicating directly between the overflow receptacle and the supply reservoir, a valve within said pipe, a vent tube within the overflow receptacle and extending therefrom, a valve within said tube, and means for simultaneously opening the air exhaust to the overflow receptacle creating a vacuum in the branches leading therefrom and closing the valves in the drain pipe and vent tube.

6. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, a platform, an adjustable shelf supported thereon to receive the bottles to be filled, a rock shaft, link bars connecting the platform and rock shaft, a foot treadle for rotating the rock shaft to raise the platform, whereby one of the ends of one of said delivery tubes and one of said branches are brought into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle.

7. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, a platform, an adjustable shelf supported thereon to receive the bottles to be filled, a rock shaft, link bars connecting the platform and rock shaft, a foot treadle for rotating the rock shaft to raise the platform, whereby one of the ends of one of said delivery tubes and one of said branches are brought into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle, a chute, and a push bar operated by said treadle by means of which the filled bottles are pushed from the shelf onto said chute.

8. In an apparatus for filling bottles, the combination of a supply reservoir, delivery tubes, tubular connections between the same and the supply reservoir, an overflow receptacle, a pipe leading therefrom having branches extending to the lower ends of the respective delivery tubes and adjacent thereto, a platform, an adjustable shelf supported thereon to receive the bottles to be filled, a rock shaft, link bars connecting the platform and rock shaft, a foot treadle for rotating the rock shaft to raise the platform, whereby one of the ends of one of said delivery tubes and one of said branches are brought into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle, a three-way cock in one of the branches leading from the overflow receptacle, a lever connected to said cock, a rod pivotally connected at its upper end to the free end of said lever and at its lower end to said rock shaft, and a check valve within one of said branches below said cock.

9. In an apparatus for filling bottles, the combination of two supply reservoirs, a plurality of delivery tubes, tubular connections between the same and both said reservoirs, two spaced apart overflow receptacles, a pipe leading from each receptacle and jointly connected to tubular branches extending to the lower ends of the respective delivery tubes and adjacent thereto, an adjustable support for the bottles, means for raising said support and thereby bringing the end of one of the delivery tubes and one of said branches into the mouth of each bottle, means for alternately exhausting said overflow receptacles of air and creating a vacuum in said branches, bottles, delivery tubes and connections therefrom to the supply reservoir, whereby the filling material is drawn into the bottles by suction and any surplus is drawn from the delivery tubes into said branches and conveyed directly to that overflow receptacle from which the air is exhausted.

10. In an apparatus for filling bottles, the combination of two supply reservoirs, a plurality of delivery tubes, tubular connections between the same and both said reservoirs, two spaced apart overflow receptacles, a pipe leading from each receptacle and jointly connected to tubular branches extending to the lower ends of the respective delivery tubes and adjacent thereto, an adjustable support for the bottles, means for raising said support and thereby bringing the end of one of the delivery tubes and one of said branches into the mouth of each bottle, means for alternately exhausting said overflow receptacles of air and creating a vacuum in said branches, bottles, delivery tubes and connections therefrom to the supply reservoir, whereby the filling material is drawn into the bottles by suction and any surplus is drawn from the delivery tubes into said branches and conveyed directly to that overflow receptacle from which the air is exhausted, a drain pipe communicating directly between each overflow receptacle and the respective supply reservoirs, a valve in each drain pipe, a vent tube within each overflow receptacle and extending therefrom, a valve in each vent tube and means for simultaneously shutting off the air exhaust from one of the overflow receptacles, opening the valves in the drain pipe and vent tube connected therewith, opening the air exhaust to the other overflow receptacle and closing the valves in the drain pipe and vent tube connected with said other receptacle.

Signed by me this 29th day of August 1916.

GILBERT F. HELSON.

DISCLAIMER.

1,253,820.—*Gilbert F. Helson*, New York, N. Y. APPARATUS FOR FILLING BOTTLES. Patent dated January 15, 1918. Disclaimer filed November 18, 1924, by the assignee, *Standard Automatic Machine Co.*

Hereby enters this disclaimer to claim 1 in said patent, which claim is in the following words, to wit:-

"1. In an apparatus for filling bottles, the combination of a supply reservoir, delivery tubes tubular connections between the same and the supply reservoir, an overflow receptacle, a pipe leading therefrom having branches extending to the lower ends of the respective delivery tubes and adjacent thereto, an adjustable support for the bottles, means for raising said support and thereby bringing the end of one of said delivery tubes and one of said branches into the mouth of each bottle, means for exhausting the air from the overflow receptacle and creating a vacuum in said branches, bottles, delivery tubes and connections therefrom to the supply reservoir, whereby the filling material is drawn into the bottles by suction and any surplus drawn from the delivery tubes into said branches and conveyed directly to the overflow receptacle."

[*Official Gazette December 2, 1924.*]